United States Patent [19]
Kellner

[11] 3,877,048
[45] Apr. 8, 1975

[54] FOCUSING DEVICE FOR PHOTOGRAPHIC OBJECTIVE ASSEMBLIES

[76] Inventor: Ferdinand Kellner, 8941 Hart 14 near Memmingen, Germany

[22] Filed: June 5, 1973

[21] Appl. No.: 367,213

[30] Foreign Application Priority Data
June 16, 1972  Germany............................ 2229444

[52] U.S. Cl. .................. 354/195; 350/255; 354/82; 354/286
[51] Int. Cl. ............................................ G03b 3/02
[58] Field of Search ............ 95/45, 86, 46; 350/187, 350/255; 354/195, 82, 286

[56] References Cited
UNITED STATES PATENTS

| | | | |
|---|---|---|---|
| 2,920,545 | 1/1960 | Kellner | 95/45 |
| 2,938,444 | 5/1960 | Kellner | 95/45 |
| 3,127,115 | 3/1964 | Yellott et al. | 350/255 X |
| 3,324,781 | 6/1967 | Clos | 95/45 |
| 3,511,159 | 5/1970 | Hobbs, Jr. | 95/86 |

*Primary Examiner*—Samuel S. Matthews
*Assistant Examiner*—E. M. O'Connor
*Attorney, Agent, or Firm*—Holman & Stern

[57] ABSTRACT

A device for assuring smooth movement of the part of an objective assembly, for example for reflex cameras, which is movable for focusing, thereby to achieve greater accuracy. The movable lens-carrying part of the assembly is supported on an elongated bridge mounted at its ends in guides in a frame which supports the camera.

7 Claims, 2 Drawing Figures

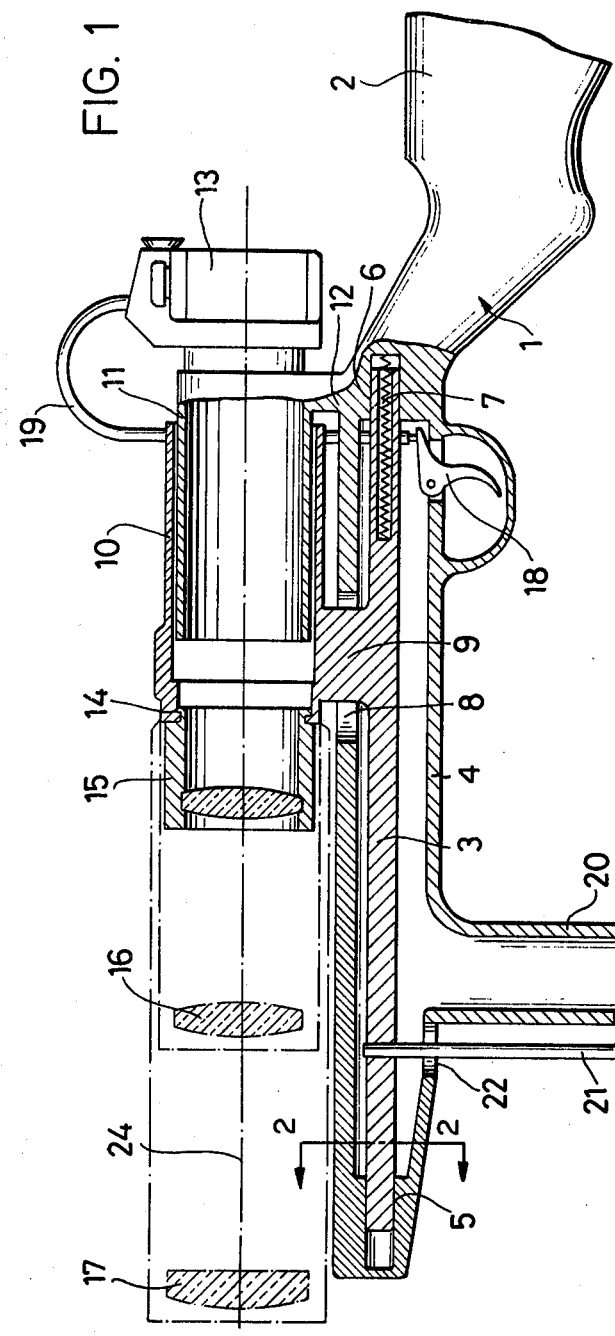

FOCUSING DEVICE FOR PHOTOGRAPHIC OBJECTIVE ASSEMBLIES

BACKGROUND OF THE INVENTION

This invention relates to a focusing device for photographic objective assemblies, and particularly for objective assemblies with lenses of long focal length used with reflex cameras.

A known form of photographic apparatus includes a support frame, a camera mounted on said frame, and an objective assembly carried by said frame and disposed in front of said camera, said assembly comprising a fixed part connected to said frame and a lens-carrying part movable relatively to said fixed part for focusing purposes under the control of a hand grip. To enable the relatively movable parts of the objective assembly to be controlled by the compression of the hand grip it is necessary for these parts to be readily movable in relation to one another, and they must be relatively guided so that the optical axis of the two parts is not at any time shifted.

Focusing devices of this kind are used particularly with objectives of long focal length, and the large dimensions of these objectives involve a comparatively heavy weight. Having regard to the relatively large weight and the requirement of very accurate relative guidance of the parts of the objective assembly, it is clear that it is difficult to achieve a desirable smooth adjustment.

A further difficulty in the known focusing devices mentioned above is that the length of the tube which is available for supporting purposes is very limited. The long projecting objective structure required for the long focal length assemblies results in substantial weight which is embarrassing in view of this limited distance between the supporting positions on the tube, and this weight generates frictional forces which in turn militate against smooth adjustment.

Attempts to solve this problem by providing additional support means in the vicinity of the leading end of the objective assembly have not proven successful because support areas of this nature involve comparatively high frictional effects and the arrangement of such additional support means opposes ready interchangeability of different objective lenses.

In the case of focusing devices which operate through the agency of screw threading, a spindle or other means, comparatively powerful forces can be applied so that in such focusing devices frictional resistances of the objective parts which are to be moved relatively to one another can be better overcome. Such focusing devices are however attended by the drawback of requiring careful attention and therefore involve a reduced rate of adjustment.

SUMMARY OF THE INVENTION

The object of the present invention is so to move a focusing device of the kind mentioned above as to obtain extremely smooth adjustment whilst at the same time retaining a precise relative guidance between the parts. This invention then is concerned with a focusing device of the type mentioned above and proposes the arrangement in which the lens-carrying part of the objective assembly is connected directly to a mounting bridge which is supported on said frame for movement in the direction of the optical axis of the assembly against the action of resilient restoring means.

The fact that the two movable parts of the objective assembly in this invention are supported at least partially on the frame, and on a mounting bridge, makes it possible to greatly increase the distance, in the direction of the optical access, between the points of support. In particular this support distance is no longer restricted by the prescribed length of tube. A multiple of this length can now readily be practised.

A further advantage of the arrangement according to the invention resides in the fact that the mounting of the relatively movable objective parts is taken from a zone which only allows it small constructional dimensions to one which provides sufficient space between the support points.

In accordance with a feature of the invention the mounting bridge is supported at its two ends in the frame. Only light-sealing means will essentially then be located between the two relatively movable parts of the objective. In an embodiment, which may not always be convenient, one support zone may be located at a position, hitherto usual, between the two parts of the objective assembly and the other located at one end of the mounting bridge. This arrangement also affords large spacing between the support points and facilitates smooth movement. It is preferred, however, to have both support points on or in the frame.

Preferably the frame will be of a hollow nature and surround the mounting bridge. In this case it is recommended that an elongated opening be provided in the frame for a connecting element, disposed between the mounting bridge and the other part of the objective, to project through.

In another embodiment of the invention, the frame may be of skeletal form, being made up of rods, struts or the like, and therefore open to a substantial degree.

It is to be preferred that a trip for the camera shall also be mounted on the frame.

In a preferred embodiment of the invention the frame is constructed in the form of a gun, with a trigger on the stock of the gun to operate the trip device of the camera. The mounting bridge extends from the front end of the stock to the zone of the trigger, and a hand grip is disposed beneath the front part of the stock in front of the trigger. The stock of the gun will also have a shoulder support.

In accordance with a further feature of the invention, the mounting bridge is provided with means to preclude any relative rocking movement between the two parts of the objective. While it is important to smooth movement during a focusing operation to accommodate the forces resulting from the weight of the assembly, with the mounting bridge allowing for this in the present invention, it is even possible to arrange for the necessary relative guidance in the horizon direction to be diverted from the mounting bridge. In a modification of this, the appropriate mutual guidance can be implemented between the parts of the objective.

A support arrangement which opposes rocking movements may for example be achieved by making the supports of the mounting bridge of polygonal cross section so that only movement in the direction of the optical axis is permitted, and rotary movement prohibited. The bridge could in this case be of rod form.

The coupling of the hand grip to the mounting bridge for controlling the relatively movable parts of the objective for focusing purposes can be implemented in various ways. The movable parts of the hand grip can be independently supported and act on the mounting bridge, or parts connected thereto, through transmission means. It is, however, better when the mounting bridge carries the movable part of the hand grip. In this connection, the invention also covers an arrangement wherein the end of the movable part of the hand grip is guided in the frame, and this guidance system provides occurrence against rocking movments. This construction is to be preferred, because the comparatively large distance of the end of the movable hand grip part from the mounting bridge is utilised in such a way as to promote a high degree of accuracy of guidance involving minimum play.

BRIEF DESCRIPTION OF THE DRAWINGS

An example of embodiment of the invention is diagrammatically illustrated in the accompanying drawing.

FIG. 1 is a reduced longitudinal sectional view of the present invention mounted on a gunstock;

FIG. 2 is a sectional view taken generally along the 2-2 of FIG. 1.

DESCRIPTION OF THE PREFERRED EMBODIMENT

The frame 1 of the device is in the form of a gun which is provided with a shoulder support 2 and has a hollow casing 4 for supporting a mounting bridge 3 of elongate form. The front part of bridge 3 is supported at 5 in the frame and the rear part at 6. The mounting bridge itself may, for example, be of cylindrical cross section and the bearings defined by cylindrical bores. A spring 7 which is arranged in a bore in the rear part 6, provides the recoil power and presses the bridge 3 into its front end position.

The objective assembly of the apparatus is directly supported from bridge 3 through an upstanding neck 9 which passes through a slot 8 in the hollow casing 4. It comprises an outer sleeve 10 connected to neck 9 and surrounding an inner tube 11 which is rigidly connected to the frame at 12 and carries the camera 13.

Light seals are provided between the two relatively movable parts 10 and 11 of the objective assembly, but thse have not been specifically illustrated.

A bayonet joint 14 is provided at the front end of sleeve 10 of the objective assembly, and this is used to hold an objective lens 15 which, for example, can be replaced by other objective lenses such as those illustrated in dotted lines at 16 and 17.

The casing 4 carries a trigger 18 which is used as a trip means and acts on the camera 13 through transmission means designated 19. Moreover, this casing is formed with a projection 20 which represents a hand grip for the arrangement. Movable relatively to this hand grip is an arm 21 which is connected to the mounting bridge 3 and passes through an opening 22 in the casing.

The lower end of the arm 21, which is used to move the bridge and in focusing the objective, is bent at 23 parallel to the optical axis 24 of the arrangement, and this part 23 serves to guard against tilting movement of the bridge.

Operation of the device according to this invention will be clear without elaboration. The hand of the user operating the focusing device engages the hand grip comprising the parts 20 and 21 and presses them together. When this is done the mounting bridge 3 moves towards the support position 6 and compresses spring 7. Sleeve 10 with the parts carrying the bayonet joint move towards the camera 13. When pressure is released from the hand grip, spring 7 moves the aforementioned parts back towards position 5.

In a practical implementation of the invention, fastening means are generally arranged between tube 11 and frame 1 to provide a firm mutual fastening, but one which will allow separation. The same applies to the connection between the objective sleeve 10 and the bridge 3.

I claim:

1. In photographic apparatus including a support frame having a hollow casing provided with a slot, a camera, and an objective assembly having an optical axis and carried by said frame and disposed in front of said camera, the improvement wherein said assembly comprises a fixed part in the form of an inner sleeve connected to said frame, the camera being mounted on the inner sleeve and a lens-carrying part in the form of an outer sleeve arranged surrounding the inner sleeve and movable relative to said fixed part for focusing purposes under the control of a hand grip, a mounting bridge movably supported in the hollow casing of the frame and provided with a neck arranged extending through the slot, said lens-carrying part being connected directly to the neck and supported by the mounting bridge, and resilient restoring means biasing the bridge, the bridge being supported on said frame for movement along the optical axis of the objective assembly against the action of resilient restoring means.

2. A photographic apparatus as claimed in claim 1, in which the mounting bridge is of elongated form and has ends mounted in bearings furnished in said frame.

3. A photographic apparatus as claimed in claim 2, in which the mounting bridge is a rod of polygonal cross-section, and the mounting bearings are defined by bores of coresponding polygonal cross-section provided in said frame.

4. A photographic apparatus as claimed in claim 3, in which the frame includes a housing part of hollow form, and the mounting bridge is disposed in this housing part.

5. A photographic apparatus as claimed in claim 1, in which the frame has a stock, a butt, and a hand grip depending from said stock, the stock, butt, and hand grip simulating a gun, the mounting bridge being movably mounted in said stock and having a depending operating arm adjacent said hand grip and movable towards and away from the latter by the hand of a user of the apparatus grasping depending arm for varying the focusing of the objective assembly.

6. A photographic apparatus as claimed in claim 5, in which said depending arm is bent and spaced from an end of the bridge to provide a part which extends parallel to the optical axis of the objective assembly, and this bent part passes through a guide opening provided in said hand grip.

7. A photographic apparatus as claimed in claim 6, in which the camera has a shutter, means are provided on the frame for tripping the shutter of the camera, and a trigger is provided on the frame for operating these trip means.

* * * * *